United States Patent
Ho et al.

(10) Patent No.: US 7,809,749 B2
(45) Date of Patent: * Oct. 5, 2010

(54) HIGH RUN-TIME PERFORMANCE SYSTEM

(75) Inventors: Mang-Rong Ho, San Jose, CA (US); Tawei Hu, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 172 days.

This patent is subject to a terminal disclaimer.

(21) Appl. No.: 12/211,903

(22) Filed: Sep. 17, 2008

(65) Prior Publication Data

US 2009/0100059 A1    Apr. 16, 2009

Related U.S. Application Data

(63) Continuation of application No. 10/459,078, filed on Jun. 11, 2003, now Pat. No. 7,478,094.

(51) Int. Cl.
*G06F 7/00* (2006.01)
*G06F 17/30* (2006.01)

(52) U.S. Cl. .................. 707/781; 711/163; 726/4; 726/27

(58) Field of Classification Search .............. None
See application file for complete search history.

(56) References Cited

U.S. PATENT DOCUMENTS

| | | | |
|---|---|---|---|
| 5,450,593 A | 9/1995 | Howell et al. | |
| 5,761,669 A * | 6/1998 | Montague et al. | 1/1 |
| 5,822,419 A * | 10/1998 | Enstone et al. | 379/201.03 |
| 5,889,952 A | 3/1999 | Hunnicutt et al. | |
| 5,956,715 A | 9/1999 | Glasser et al. | |
| 5,999,978 A * | 12/1999 | Angal et al. | 709/229 |
| 6,038,563 A * | 3/2000 | Bapat et al. | 1/1 |
| 6,061,684 A | 5/2000 | Glasser et al. | |
| 6,064,656 A * | 5/2000 | Angal et al. | 370/254 |
| 6,085,191 A * | 7/2000 | Fisher et al. | 1/1 |
| 6,105,027 A * | 8/2000 | Schneider et al. | 1/1 |
| 6,212,511 B1 * | 4/2001 | Fisher et al. | 1/1 |
| 6,237,036 B1 * | 5/2001 | Ueno et al. | 709/225 |
| 6,308,173 B1 | 10/2001 | Glasser et al. | |
| 6,438,549 B1 * | 8/2002 | Aldred et al. | 1/1 |
| 6,499,107 B1 | 12/2002 | Gleichauf et al. | |
| 6,535,879 B1 * | 3/2003 | Behera | 1/1 |

(Continued)

*Primary Examiner*—Khanh B Pham
*Assistant Examiner*—Shew-Fen Lin
(74) *Attorney, Agent, or Firm*—Tucker Ellis & West LLP (57) ABSTRACT

A system and article of manufacture providing a high performance access control list. The preferred embodiments operate in a computer network having a plurality of users of the network and comprising a database management system and a content management system controlling access to a plurality of entities shareable by the users of the network, the content management system using an access control list table having group privilege rules and user privilege rules for controlling access to the entities. A high performance ACL system and article of manufacture is provided, the system and article including a run-time compiled ACL table, wherein the compiled ACL table provides resolved privilege rules for each of the users at run-time, and using the compiled ACL table, the content management system accesses user-selected ones of the entities based on the resolved privilege rules.

26 Claims, 3 Drawing Sheets

U.S. PATENT DOCUMENTS 6,581,060 B1 * 6/2003 Choy ............................... 1/1
6,976,023 B2 12/2005 Chen et al.
7,380,271 B2 * 5/2008 Moran et al. .................. 726/4

* cited by examiner

FIG. 5

HIGH RUN-TIME PERFORMANCE SYSTEM

CROSS REFERENCE TO RELATED APPLICATIONS

This application is a continuation of U.S. application Ser. No. 10/459,078 which was filed on Jun. 11, 2003 now U.S. Pat. No. 7,478,094.

BACKGROUND OF THE INVENTION

This application pertains to the problem of flexibly and efficiently controlling the access rights of a large number of users to a large number of objects or other data entities. The problem arises, for example, in the context of a large number of users sharing access to a database management system on a network in which end users are given differing levels of access to different entities in the managed database. These entities represent the content of the network, as seen by end users. The entities may include, for example, data files, image files, sound files, multimedia files, client account information, etc.

The need to assign user-specific access rights to different entities arises in a variety of situations. For example, it may be desirable to give some users read/write access to certain entities, meaning that these users can replace data representing the entity, while others users may be limited to read-only access, meaning that these users can view the data but not alter or delete the data representing the entity. Some users may not be given any access to certain critical entities.

Various techniques are known in the art for controlling user accesses to objects and other data entities. One technique, which is commonly used in file systems, involves the storage of an access control list (ACL) for each data entity to which access is to be controlled. The ACL for a given data entity will typically be in the form of a list of the users or groups that have access to the data entity, together with the access rights or privileges of each such user or group with respect to the data entity. The organizing of users into groups simplifies the maintenance of an ACL, especially where a large number of users share the same set of access privileges. Such a group, for example, would be a public access group which would normally have limited, read-only access privileges. A user may, however, belong to a group with which many privileges are shared with other users, but where the user has some additional privileges or restrictions than the associated group. In such cases, the ACL can contain a user privilege that overrides the group privilege for particular database entities.

Each time a user requests access to an entity, a content management system (CMS) operating with or within the database management system will search the data entity's ACL to determine whether the user has been given user-specific privileges with respect to the requested entity. If the user has not been assigned user-specific privileges, the CMS may have to then search the ACL to determine group membership for the user, and then find the group privileges with respect to the requested entity.

With the increasing popularity and importance of networked resources it has become increasingly important to be able to provide rapid privilege determination to large numbers of users with controlled access to large numbers of content entities, particularly in high volume transaction environments. To provide flexibility, it is desirable to be able to individualize the access rights of users, and still provide a high performance run-time resolution of the user's privileges.

Although prior art access control techniques such as those summarized above are suitable in theory for flexibly controlling user access to large-scale networked databases, these techniques tend to take unacceptably long periods of time to search because of the number of searches that must be performed to resolve both group and individual user privileges.

A need thus exists in the art for a high performance run-time technique that is suitable for flexibly controlling the access of a large number of users and groups to data entities. A need also exists to be able to flexibly and efficiently define new types of access privileges as new users and groups are added to, or deleted from the system.

The embodiments of the claimed invention therefore provide solutions to the aforementioned problems, and offer other advantages over the prior art.

BRIEF SUMMARY OF THE INVENTION

In accordance with the present invention, there is provided a system providing a high performance ACL in a computer network having a plurality of users of the network. The network includes a database management system and a content management system controlling access to a plurality of entities shareable by the users of the network. The content management system uses an access control list table having group privilege rules and user privilege rules for controlling access to the entities. The system provides a run-time compiled ACL table, run-time being the duration of time that the entities are available to the users, wherein the compiled ACL table provides resolved privilege rules for each of the users at run-time. The system further uses the compiled ACL table, the content management system accessing user-selected ones of the entities based on the resolved privilege rules.

In accordance with another aspect of the present invention, there is also provided a computer network system having a plurality of users of the network system. The system comprises a database management system and a content management system configured to control access to a plurality of entities shareable by the users of the network system. The content management system is configured to use an access control list table having group privilege rules and user privilege rules for controlling access to the entities, and comprises a means of providing a run-time compiled ACL table and a means of using the compiled ACL table. The content management system is configured to access user-selected ones of the entities based on the resolved privilege rules.

In accordance with yet another aspect of the present invention, there is provided an article of computer-readable media having contents that provide a high performance security by means of an ACL on a computer network having a plurality of users of the network. The network comprises a database management system and a content management system controlling access to a plurality of entities shareable by the users of the network. The content management system uses an access control list table having group privilege rules and user privilege rules for controlling access to the entities. The network is configured to perform the computer-implemented steps of providing a run-time compiled ACL table and using a compiled ACL table, the content management system accessing user-selected ones of the entities based on resolved privilege rules.

The embodiments of the claimed invention reduce the time required to determine privilege rules for the users at run-time based on the compiled ACL table of resolved privilege rules for each user.

The compiled ACL table can be updated during run-time, thereby maintaining the reduction in time provided by the embodiments of the present invention.

Also, more users and transactions can be supported at run-time without straining system resources.

Other uses and applications of the subject system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings hereof and wherein.

DETAILED DESCRIPTION OF THE INVENTION

Reference will now be made in detail to the preferred embodiments of the present invention, examples of which are illustrated in the accompanying drawings, wherein like reference numerals refer to like elements throughout.

The detailed description which follows is presented in terms of general procedures, steps and symbolic representations of operations of data bits within a computer memory, associated computer processors, networks, and network devices. These procedure descriptions and representations are the means used by those skilled in the data processing art to convey the substance of their work to others skilled in the art. A procedure is here, and generally, conceived to be a self-consistent sequence of steps or actions leading to a desired result. Thus, the term "procedure" is generally used to refer to a series of operations performed by a processor, be it a central processing unit of a computer, or a processing unit of a network device, and as such, encompasses such terms of art as "objects," "functions," "subroutines" and "programs."

The procedures presented herein are not inherently related to any particular computer or other apparatus. In particular, various general purpose machines may be used with programs in accordance with the teachings herein, or it may prove more convenient to construct more specialized apparatus to perform the required method steps.

However, one of ordinary skill in the art will recognize that there exists a variety of platforms and languages for creating software for performing the procedures outlined herein. One of ordinary skill in the art also recognizes that the choice of the exact platform and language is often dictated by the specifics of the actual system constructed, such that what may work for one type of general purpose computer may not be efficient on another type of general purpose computer.

One of ordinary skill in the art to which this invention belongs will have a solid understanding of content management systems, database management systems, and methods of securely controlling access to entities managed by the content management system such as an access control list (ACL) in particular. It being recognized that such practitioners do not require specific details of the software, but rather find data structure descriptions and process descriptions more desirable (due to the variety of suitable hardware and software platforms), such specifics are not discussed to avoid obscuring the invention.

Various terms are used to describe the invention that are well known to practitioners of the art are listed here for convenience.

Access Control List (ACL)

A set of one or more access control rules. These rules are used to control access to CM controlled Entities.

Access Control Rule (ACL Rule)

A rule specifies who (Users/Groups/Public) can perform what functions (ACL Privileges) on specific CM controlled entities. Rules with the same ACL Code form an ACL.

ACL Code

A CM system-generated unique identifier for an ACL. The CM Controlled Entity ACL binding is carried out using this code.

ACL Privileges

Operations specified in an ACL Rule that are allowed to be applied on the bound controlled entity by the ACL-specified users. See also User Privileges.

ACL Rule for Group

An ACL Rule that is pertinent to a group.

ACL Rule for Public

An ACL Rule that is pertinent to all users.

ACL Rule for User

An ACL Rule that is pertinent to an individual user.

Compiled ACL Table

A simulated database summary table that contains compiled ACLs. It optimizes runtime access control resolving.

Compiled Permission Table

A simulated database summary table that contains compiled user privileges. It optimizes runtime access control resolving.

Controlled Entity

A unit of protected user data that can be an item, an item type or the entire library. It must be bound to an ACL. Access to a controlled entity is authorized by both user privileges and the ACL.

Group

A number of zero of more users. Used only for defining ACLs, not granting user privileges.

Item

An atomic user data entity stored in the CM Library Server.

Item Type

A schema definition for a collection of items. Also used to represent all items that conform to the same schema definition.

Library

The entire collection of user data stored in the CM system.

Privilege

An ability to use the CM system. A user must be grouped into the privilege set before the CM system can be used.

Privilege Definition Code

A CM system-generated unique identifier for each CM privilege.

Privilege Set

A named group of privileges. It is used for both defining ACLs and granting privileges to users.

Privilege Set Code

A CM system-generated unique identifier for each CM privilege set. User privileges granting and ACL defining are carried out using this code.

System-defined Privilege

A CM system-defined privilege definition. See also User-defined privilege.

System Entity

The CM system management entities which can be system tables, views, indexes and stored procedures. A system entity has no ACL associated with it. Access to system entities is authorized only by the user privileges. See also controlled entity.

User

A registered CM user that can obtain CM services.

User-defined Privilege

The CM user-defined application-specific privileges. See also system-defined privilege.

UserID

A unique name for a CM user. Used for runtime authentication and access control.

User Privileges

A number of privileges granted to every CM User, stored in a user profile. It defines the maximum operations a user can perform. A user's effective access rights will never exceed his user privileges. See also ACL privileges.

Figure 1:
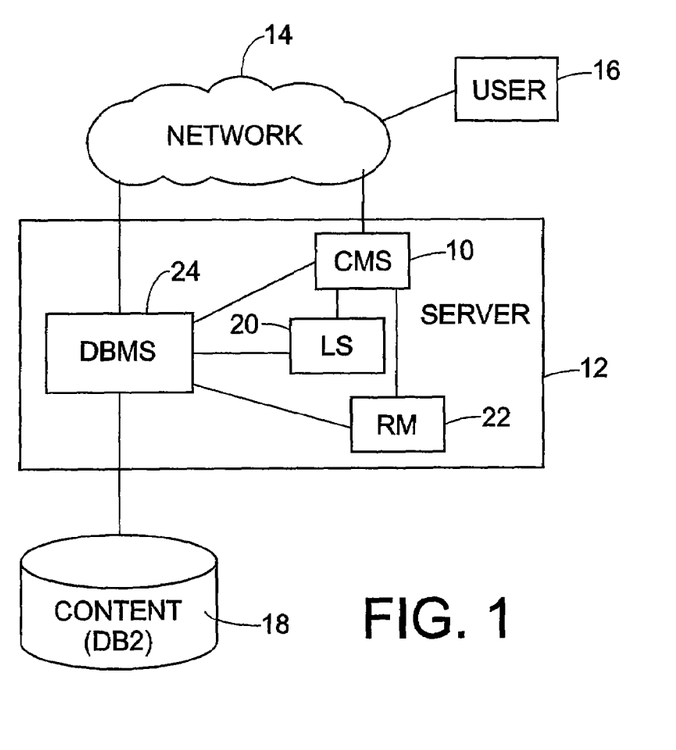
FIG. 1 is a block diagram of a network-connected content management system in accordance with a preferred embodiment of the present invention.

FIG. 1 is a block diagram of a network-connected content management system in accordance with a preferred embodiment of the present invention. The system shown in FIG. 1 is particularly suited to delivery of content over a network or the Internet. A content management system 10 is running on a server computer 12 which is connected to a network 14. A user 16 of the CMS 10 accesses controlled entities on a content database 18, such as a DB2 database for instance, by communicating with the CMS 10 via the network 14. The CMS 10 is in communication with a library server (LS) 20, a resource manager (RM) 22 and a database management system (DBMS) 24. The CMS 10, LS 20, RM 22 and the DBMS 24 are shown in the figure as running on the same server 12, however, it is to be appreciated that some or all of these may be running on separate, network connected, computers.

A concept of the CM access control model is that of user privileges. Each CM user 16 is granted a number of privileges. These privileges define the maximum scope of operations that a user can perform. A user's effective access rights to content on the database 18 will never exceed the user=s particular user privileges.

Another concept is that of the controlled entity. A controlled entity is a unit of protected user data on the database 18. In the CM system, this can be an item, an item type, or the entire Library. The operation(s) applied on a controlled entity is authorized by one or more control rules from an access control list. Every CM Controlled Entity must be bound to an ACL. An item can be bound to an ACL in different levels. When an operation is applied to an item, an access control will check for the user's ACL privilege based on the configured binding level.

ACL, still another concept of the CM access control model, is one or more rules, associated with a controlled entity, authorizes user operation(s) on the bound entity. In particular, it specifies who (Users/Groups/Public) can perform what functions (ACL privileges) on the controlled entity. An ACL only defines the authorization of the bound entities and does not circumvent the user privileges.

Figure 2:
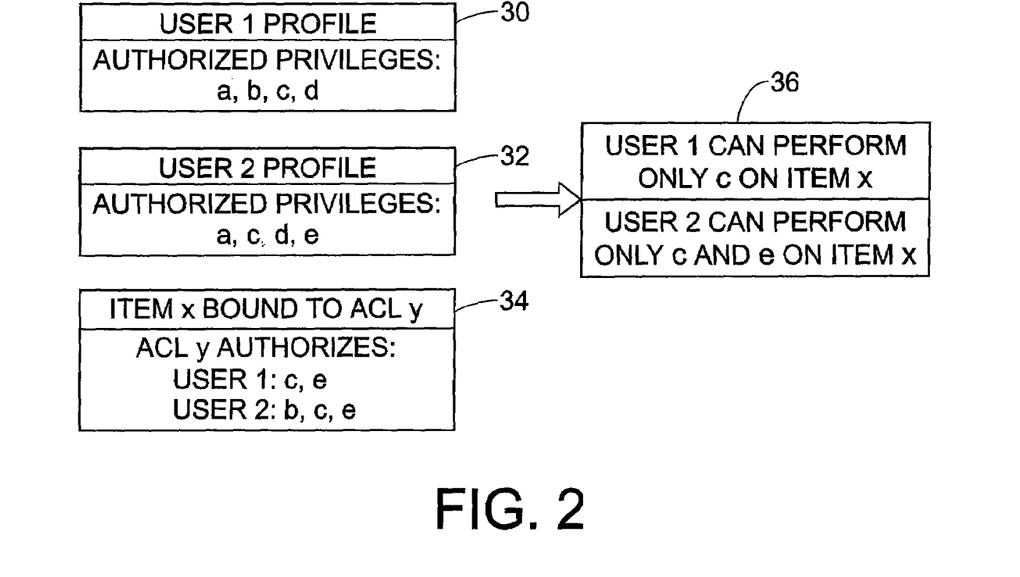
FIG. 2 is a block diagram depicting how a user needs to pass both user privileges and bound ACL checks.

In general, to perform an operation on a CM controlled entity, the user needs to pass both the user privileges and the bound ACL checks, as depicted in FIG. 2. For example, user 1 privileges 30 are allow operations a, b, c and d. User 2 privileges 32 allow operations a, c, d and e. However, item X binding 34 is to ACL code Y which allows user 1 to perform operations c and e on item X, while user 2 is permitted to perform operations b, c and e on item X. The resulting allowed operations 36 for users 1 and 2 permit user 1 to perform only operation c on item X, and permit user 2 to perform only operations c and e on item X.

The scope of the present invention, however, is primarily concerned with the resolving of ACL rules for each user, and the following description will, therefore, concentrate on the aspect of ACL rule resolving for users and user groups.

A CM group consists of zero or more users, usually with the same job description. A user may belong to none or to any number of groups. A group, however, should not belong to other groups. CM groups do not usually relate to DBMS or operating system groups. They serve rather as a convenient shorthand for defining ACLs only.

Figure 3:
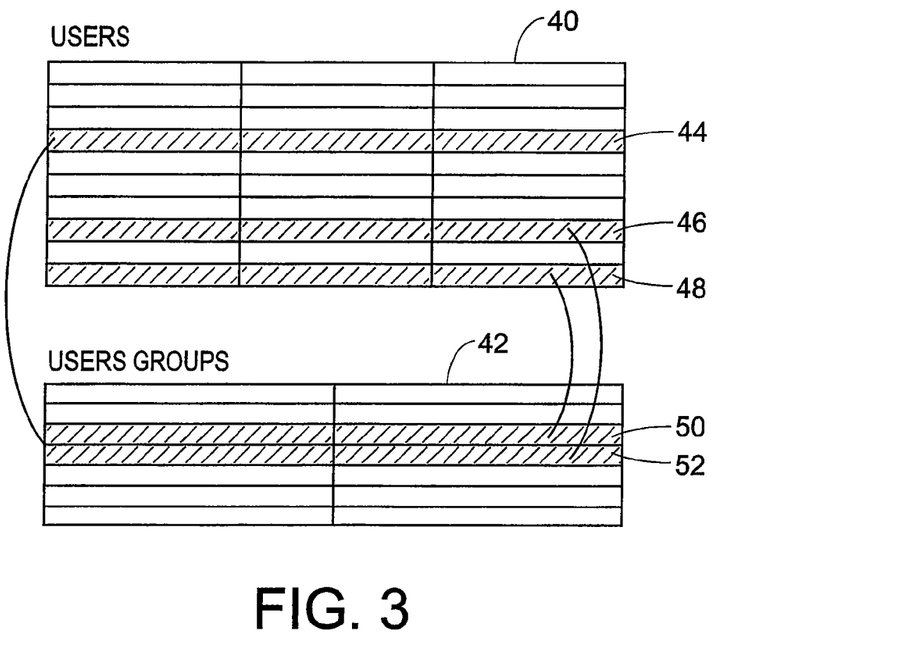
FIG. 3 depicts user and group associations as maintained in a table in accordance with the present invention.

Groups are represented as CM users and stored in a user table with a User-Kind column containing a unique value, such as 1, standing for "Group". User and group associations are maintained in another table as depicted in FIG. 3. The user table 40 contains both user and group entries, while the user-group association table 42 contains the relationships between users and groups. For example, a group 44 in the user table 40 consists of a first user 46 and a second user 48, and the relationship is defined by the first group-user association 50 and the second group-user association 52 in the user-group association table 42.

An ACL consists of one or more access control rules. Each ACL is assigned a unique identifier called Access Control List Code (ACL Code). The ACL definitions and codes are stored in a CM system access-list table.

An access control rule specifies who (Users/Groups/public) can perform what functions (ACL Privileges). Rules with the same ACL Code form an ACL. The rule definitions and the associations of rules with ACL are maintained in the system access-list table.

Figure 4:
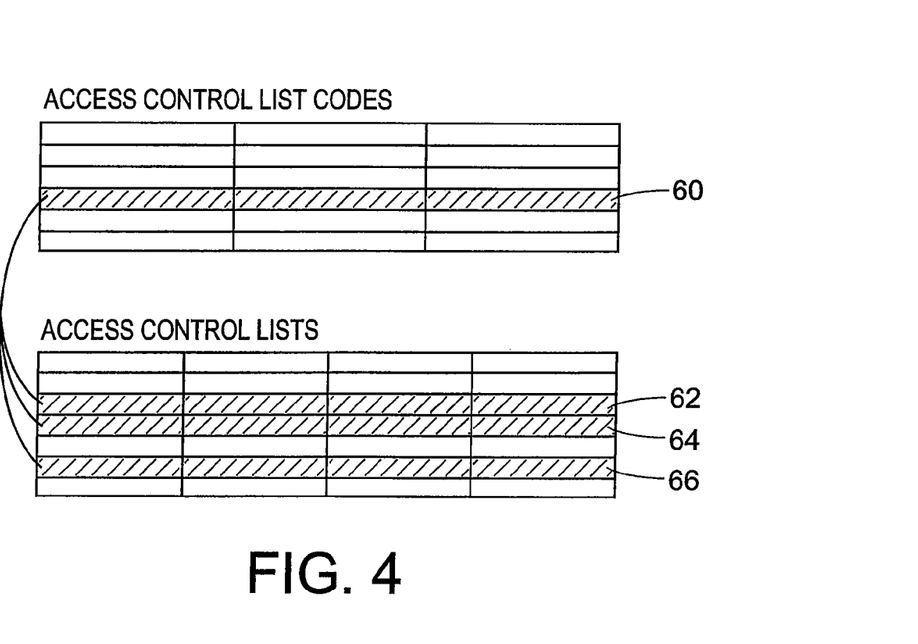
FIG. 4 diagrammatically shows the relationship between ACL codes and access control lists.

The ACL codes and lists are depicted in the diagram shown in FIG. 4. For example, an ACL code 60 defines an ACL comprising the rules 62, 64 and 66 having that same ACL code.

A CM controlled entity is bound to a specific ACL through the ACL Code. When associated with CM controlled entities, ACLs define the authorization of the bound entities and do not circumvent the User Privileges. ACL is enforced in addition to the User Privileges check as previously described.

The user specified in access control rules can be an individual user, a group, or public. The interpretation is determined by a user-kind field of the respective rule. The types of rules, for illustration purposes, can be given the names ACL Rule for User, ACL Rule for Group, and ACL Rule for Public, respectively. By specifying public, the ACL Rule for Public authorizes all the users to perform operations specified in the ACL Privileges on the bound entity, provided each user passes the respective user privilege check.

Within the same ACL, a user may be specified in more than one type of rule. The precedence of the three types, from highest to lowest, is ACL Rule for Public, ACL Rule for User, ACL Rule for Group. When applying ACL checks, if any higher-precedence rule type passes, the authorization is resolved and the process stops. If, for instance, the check of the ACL Rule for Public fails, the checking process continues to the lower-precedence rule types. If the check of the ACL Rule for User fails, however, the checking can stop; i.e., the ACL Rule for Group need not be checked. There is no need to continue the check on the Group type because, if a user does an individual User check, meaning the user has a rule in the access list table, this user will be excluded from the Group type access based on an access control algorithm. Therefore, the access control check for an individual User type and a Group type is not a sequential process, but an either/or process, even though there is no harm in doing a sequential check. If, however, the user is failed on an individual User type check, or the user does not have a rule in the access list table, the checking process continues to the Group type. If the user belongs to one of groups and the check of privilege passes, the authorization is considered resolved and the process stops. Otherwise, the user is denied permission and the process also stops. When a user is specified in more than one ACL Rule for a group, the user is authorized by the union of all the specified rules' ACL privileges. A user should not be specified in more than one ACL rule for a user.

To optimize the user privilege resolving process, a CM access control module provides a simulated summary table, called the compiled ACL Table. This table contains the resolved access control information, meaning that each row in the table represents an authorized privilege for a user that is defined in an ACL rule. When accessing an item, this table will be joined on the item's ACL code, constrained by the run-time user's name and the desired privilege. If such a row exists, the operation on that item is allowed, otherwise it is denied.

To further optimize the resolving process, a compiled ACL table according to a preferred embodiment of the present invention is provided that enables run-time privilege resolving by simply querying one table, without any table joins as previously described. For example, a user desires to create an item instance in the database 18 of FIG. 1, and the LS 20 determines an appropriate ACL code for the item. To determine if the user can create the desired item, the LS 20 only needs to query the compiled ACL with the specified ACL code to determine if the user has the necessary privilege to create the item or not.

An algorithm according to the preferred embodiment is herein described that ensures that the compiled ACL table contains privileges either extracted from the user ACL rule or the group ACL rule, eliminating the need for table joins. The method hereinafter described, is suitable for building an initial run-time compiled ACL table, and for maintaining the compiled ACL table during run-time, wherein run-time is defined as the period of time that the CM system is actively serving users.

Figure 5:
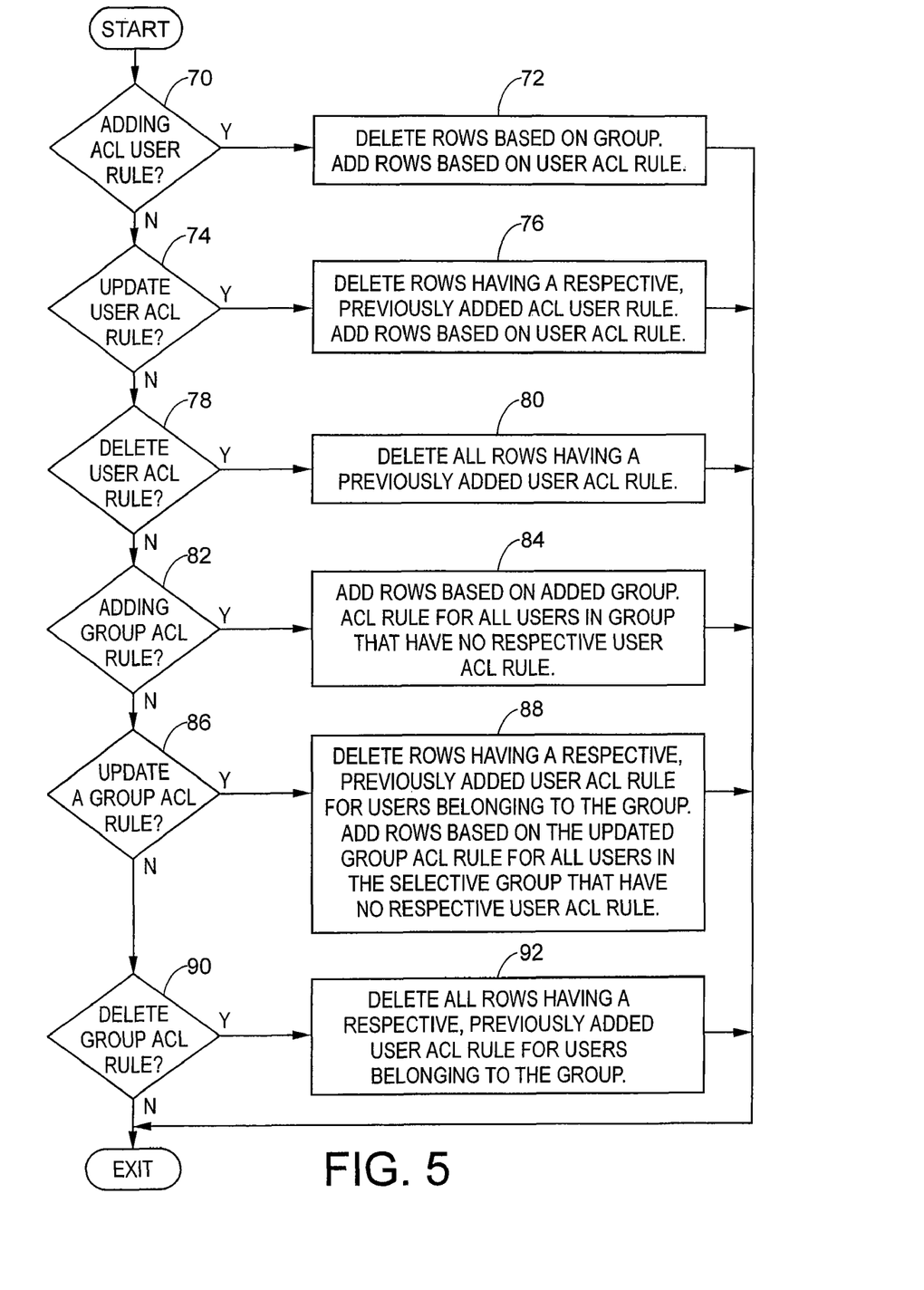
FIG. 5 is a flow diagram of a method according to a preferred embodiment of the present invention.

Referring now to FIG. 5, the preferred algorithm is now described. At step 70 it is determined if a user ACL is being added. If a user ACL is being added, at step 72, rows are deleted rows from the compiled ACL table based on group rules for the respective user, rows are added to the compiled ACL table based on the added user ACL rule.

If a user ACL rule is being updated as determined at step 74, step 76 is invoked to delete all rows from the compiled ACL table having a respective previously added user ACL rule and rows are added to the compiled ACL table based on the added user ACL rule.

If a user ACL rule is being deleted as determined at step 78, step 80 is invoked to delete all rows from the ACL table having a respective previously added user ACL rule.

If a group ACL rule is being added as determined at step 82, processing at step 84 adds rows to the compiled ACL table based on the added group ACL rule for all users included in the specified group that have no respective user ACL rule.

If a group ACL rule is being updated as determined at step 86, step 88 is invoked to delete all rows from the compiled ACL table having a respective previously added user ACL rule for a user belonging to the specified group, and rows are added to the compiled ACL table based on the added group ACL rule for all users included in the specified group that have no respective user ACL rule.

If a group ACL rule is being deleted as determined at step 90, step 92 is invoked to delete all rows from the compiled ACL table having a respective previously added user ACL rule for a user belonging to the specified group.

The invention has been described with reference to the preferred embodiments. Potential modifications and alterations will occur to others upon a reading and understanding of the specification. It is our intention to include all such modifications and alterations insofar as they come within the scope of the appended claims, or the equivalents thereof.

Having thus described our invention, we now claim:

1. A computer network system having a plurality of users of the network system comprising:
   a server computer;
   a database management system; and
   a content management system configured to control access to a plurality of entities shareable by said users of said network system, the content management system configured to use an access control list (ACL) table having group ACL rules and user ACL rules for controlling access to the entities, comprising:
   means of providing a run-time compiled ACL table including means for building an initial version of the run-time compiled ACL table including rows based on the ACL table for all users included in the ACL table, the run-time compiled ACL table including resolved privilege rules for each of said users available at run-time;
   means of using said content management system configured, accessing user-selected ones of said entities based on said resolved privilege rules at said run-time compiled ACL table, wherein said run-time compiled ACL table enables said content management system to resolve said privilege rules without table joins by querying said run-time complied ACL table;
   means of maintaining said user ACL rules in said run-time compiled ACL table including: means selectively adding one or more user ACL rules including means for deleting rows from said run-time compiled ACL table based on group rules for the respective user and means for adding rows to the run-time compiled ACL table based on the added user ACL rule; means selectively updating a user ACL rule including means for deleting rows from the run-time compiled ACL table having a respective previously added user ACL rule; and means for adding rows to the run-time compiled ACL table based on the updated ACL rule; and means selectively deleting a user ACL rule including means for deleting rows from the run-time compiled ACL table having a respective previously added user ACL rule; and,
   means of maintaining said group ACL rules in said run-time compiled ACL table including means selectively adding a group ACL rule and means selectively updating a group ACL rule.

2. The computer network system as set forth in claim 1, wherein the means for maintaining said group ACL rules comprises:
   means for selectively adding a group ACL rule comprising a means for adding rows to said run-time compiled ACL table based on the added group ACL rule for all users included in the selective group that have no respective user ACL rule;
   means for selectively updating a group ACL rule comprising:
      means for deleting all rows from said run-time compiled ACL table having a respective previously added user ACL rule for a user belonging to the selective group; and
      means for adding rows to said run-time compiled ACL table based on the updated group ACL rule for all users included in the selective group that have no respective user ACL rule; and means for selectively deleting a group ACL rule comprising a means for deleting all rows from said run-time compiled ACL table having a respective previously added user ACL rule for a user belonging to the selective group.

3. The computer network system as set forth in claim 1, further comprising a means for maintaining said ACL table during run-time.

4. The computer network system as set forth in claim 1 wherein said run-time compiled ACL table includes a plurality of access control lists, wherein said ACL table comprises rows, each row including an ACL code defining the respective ACL for the row of the plurality of access control lists.

5. The computer network system as set forth in claim 4, wherein said means for providing comprises:
   means for building an initial version of said run-time compiled ACL table including rows based on said ACL table for all users and ACL codes included in said ACL table;
   means for maintaining said user ACL rules for each of said ACL codes in said run-time compiled ACL table during run-time; and
   means for maintaining said group ACL rules for each of said ACL codes in said run-time compiled ACL table during run-time.

6. The computer network system as set forth in claim 1, wherein the means of using the content management system includes using the content management system to access said user-selected ones of said entities based on said resolved privilege rules of said run-time compiled ACL table, wherein said run-time compiled ACL table enables said content management system to resolve said user privileges without table joins and exclusively by querying said run-time compiled ACL table.

7. The computer network system as set forth in claim 1, wherein:
   said means of maintaining said user ACL rules includes means of maintaining said user ACL rules in the run-time compiled ACL table; and,
   said means of maintaining said group ACL rules includes means of maintaining said group ACL rules in the run-time compiled ACL table during run time.

8. An article of manufacture having contents that cause a computer network having a plurality of users of the network, and comprising a database management system and a content management system, stored in a server computer, controlling access to a plurality of entities shareable by said users of the network, the content management system using an access control list (ACL) table having group ACL rules and user ACL rules for controlling access to the entities, to provide resolving user privileges in the content management system to access user-selected entities by performing the computer-implemented steps of:
   providing a run-time compiled ACL table by building an initial version of the run-time compiled ACL table including rows based on the ACL table for all users included in the ACL table, the run-time compiled ACL table including resolved privilege rules for each of said users available at run-time;
   using said content management system, accessing user-selected ones of said entities based on said resolved privilege rules of said run-time compiled ACL table, wherein said run-time compiled ACL table enables said content management system to resolve said user privilege rules without table joins by querying said run-time compiled ACL table;
   maintaining said user ACL rules in said run-time compiled ACL table by: selectively adding one or more user ACL rules by deleting rows from the run-time compiled ACL table based on group rules for the respective user and adding rows to the run-time compiled ACL table based on the added user ACL rule; selectively updating a user ACL rule by deleting rows from the run-time compiled ACL table having a respective previously added user ACL rule, and adding rows to the run-time compiled ACL table based on the updated user ACL rule; and selectively deleting a user ACL rule by deleting rows from the ACL table having a respective previously added user ACL rule; and
   maintaining said group ACL rules in said run-time compiled ACL table by selectively adding a group ACL rule and selectively updating a group ACL rule.

9. The article of manufacture as set forth in claim 8, wherein the maintaining said group ACL rules step comprises the computer-implemented steps of:
   selectively adding a group ACL rule by adding rows to said compiled ACL table based on the added group ACL rule for all users included in the selective group that have no respective user ACL rule;
   selectively updating a group ACL rule by:
      deleting all rows from said run-time compiled ACL table having a respective previously added user ACL rule for a user belonging to the selective group; and
      adding rows to said run-time compiled ACL table based on the updated group ACL rule for all users included in the selective group that have no respective user ACL rule; and
   selectively deleting a group ACL rule by deleting all rows from said run-time compiled ACL table having a respective previously added user ACL rule for a user belonging to the selective group.

10. The article of manufacture as set forth in claim 8, further comprising the computer-implemented step of maintaining said ACL table during run-time.

11. The article of manufacture as set forth in claim 8, wherein said ACL table includes a plurality of access control lists, wherein said ACL table comprises rows, each row including an ACL code defining the respective ACL for the row of the plurality of access control lists.

12. The article of manufacture as set forth in claim 11, wherein said providing said run-time compiled ACL table includes building an initial version of said run-time compiled ACL table including rows based on said ACL table for all users and ACL codes included in said ACL table;
   maintaining said user ACL rules for each of said ACL codes in said run-time compiled ACL table during run-time; and
   maintaining said group ACL rules for each of said ACL codes in said run-time compiled ACL table during run-time.

13. The article of manufacture as set forth in claim 8, wherein the accessing said user-selected ones of said entities includes:
   accessing the user-selected ones of the entities based on said resolved privilege rules of said run-time compiled ACL table, wherein said run-time compiled ACL table enables said content management system to resolve said user privileges without table joins and exclusively by querying said run-time compiled ACL table.

14. The article of manufacture as set forth in claim 8, wherein:
   said maintaining said user ACL rules in said run-time compiled ACL table includes maintaining the user ACL rules during run time; and, said maintaining said group ACL rules in said run-time compiled ACL table includes maintaining the group ACL rules during run time.

15. A computer network system having a plurality of users of the network system comprising:
a server computer;
a database management system; and
a content management system configured to control access to a plurality of entities shareable by said users of said network system, the content management system configured to use an access control list (ACL) table having group ACL rules and user ACL rules for controlling access to the entities, comprising:
means of providing a run-time compiled ACL table including means for building an initial version of the run-time compiled ACL table including rows based on the ACL table for all users included in the ACL table, the run-time compiled ACL table including resolved privilege rules for each of said users available at run-time;
means of using said content management system configured, accessing user-selected ones of said entities based on said resolved privilege rules at said run-time compiled ACL table, wherein said run-time compiled ACL table enables said content management system to resolve said privilege rules without table joins and by querying said run-time complied ACL table;
means of maintaining said user ACL rules in said run-time compiled ACL table including means selectively adding one or more user ACL rules, means selectively updating a user ACL rule, and means selectively deleting a user ACL rule; and,
means of maintaining said group ACL rules in said run-time compiled ACL table including:
means selectively adding a group ACL rule including means for adding rows to said run-time compiled ACL table based on the added group ACL rule for all users included in the selective group that have no respective ACL rule;
means selectively updating a group ACL rule including means for deleting rows from said run-time compiled ACL table having a respective previously added user ACL rule for a user belonging to the selective group, and means for adding rows to said run-time compiled ACL table based on the updated group ACL rule for all users included in the selective group that have no respective user ACL rule; and,
means for selectively deleting a group ACL rule including a means for deleting rows from the run-time compiled ACL table having a respective previously added user ACL rule for a user belonging to the selective group.

16. The computer network system as set forth in claim 15, further comprising a means for maintaining said ACL table during run-time.

17. The computer network system as set forth in claim 15, wherein said run-time compiled ACL table includes a plurality of access control lists, wherein said ACL table comprises rows, each row including an ACL code defining the respective ACL for the row of the plurality of access control lists.

18. The computer network system as set forth in claim 17, wherein said means for providing comprises:
means for building an initial version of said run-time compiled ACL table including rows based on said ACL table for all users and ACL codes included in said ACL table;
means for maintaining said user ACL rules for each of said ACL codes in said run-time compiled ACL table during run-time; and means for maintaining said group ACL rules for each of said ACL codes in said run-time compiled ACL table during run-time.

19. The computer network system as set forth in claim 15, wherein the means of using the content management system includes using the content management system to access said user-selected ones of said entities based on said resolved privilege rules of said run-time compiled ACL table, wherein said run-time compiled ACL table enables said content management system to resolve said user privileges without table joins and exclusively by querying said run-time compiled ACL table.

20. The computer network system as set forth in claim 15, wherein:
said means of maintaining said user ACL rules includes means of maintaining said user ACL rules in the run-time compiled ACL table; and,
said means of maintaining said group ACL rules includes means of maintaining said group ACL rules in the run-time compiled ACL table during run time.

21. An article of manufacture having contents that cause a computer network having a plurality of users of the network, and comprising a database management system and a content management system, stored in a server computer, controlling access to a plurality of entities shareable by said users of the network, the content management system using an access control list (ACL) table having group ACL rules and user ACL rules for controlling access to the entities, to provide resolving user privileges in the content management system to access user-selected entities by performing the computer-implemented steps of:
providing a run-time compiled ACL table by building an initial version of the run-time compiled ACL table including rows based on the ACL table for all users included in the ACL table, the run-time compiled ACL table including resolved privilege rules for each of said users available at run-time;
using said content management system, accessing user-selected ones of said entities based on said resolved privilege rules of said run-time compiled ACL table, wherein said run-time compiled ACL table enables said content management system to resolve said user privilege rules without table joins by querying said run-time compiled ACL table;
maintaining said user ACL rules in said run-time compiled ACL table by selectively adding one or more user ACL rules, selectively updating a user ACL rule, and selectively deleting a user ACL rule; and
maintaining said group ACL rules in said run-time compiled ACL table by:
selectively adding a group ACL rule by adding rows to said run-time compiled ACL table based on the added group ACL rule for all users included in the selective group that have no respective user ACL rule;
selectively updating a group ACL rule by deleting rows from the run-time compiled ACL table having a respective previously added user ACL rule for a user belonging to the selective group, and adding rows to the run-time compiled ACL table based on the updated group ACL rule for all users included in the selective group that have no respective user ACL rule; and,
selectively deleting a group ACL rule by deleting rows from said run-time compiled ACL table having a respective previously added user ACL rule for a user belonging to the selective group.

22. The article of manufacture as set forth in claim 21, further comprising the computer-implemented step of maintaining said ACL table during run-time.

23. The article of manufacture as set forth in claim 21, wherein said ACL table includes a plurality of access control lists, wherein said ACL table comprises rows, each row including an ACL code defining the respective ACL for the row of the plurality of access control lists.

24. The article of manufacture as set forth in claim 23, wherein said providing said run-time compiled ACL table includes building an initial version of said run-time compiled ACL table including rows based on said ACL table for all users and ACL codes included in said ACL table;
   maintaining said user ACL rules for each of said ACL codes in said run-time compiled ACL table during run-time; and
   maintaining said group ACL rules for each of said ACL codes in said run-time compiled ACL table during run-time.

25. The article of manufacture as set forth in claim 21, wherein the accessing said user-selected ones of said entities includes:
   accessing the user-selected ones of the entities based on said resolved privilege rules of said run-time compiled ACL table, wherein said run-time compiled ACL table enables said content management system to resolve said user privileges without table joins and exclusively by querying said run-time compiled ACL table.

26. The article of manufacture as set forth in claim 21, wherein:
   said maintaining said user ACL rules in said run-time compiled ACL table includes maintaining the user ACL rules during run time; and,
   said maintaining said group ACL rules in said run-time compiled ACL table includes maintaining the group ACL rules during run time.

* * * * *